US00RE38487E

(19) United States
(12) Reissued Patent
Isham et al.

(10) Patent Number: US RE38,487 E
(45) Date of Reissued Patent: Apr. 6, 2004

(54) SYNCHRONOUS-RECTIFIED DC TO DC CONVERTER WITH IMPROVED CURRENT SENSING

(75) Inventors: Robert H. Isham, Flemington, NJ (US); Charles E. Hawkes, Cary, NC (US); Michael M. Walters, Apex, NC (US)

(73) Assignee: Intersil Communications, Inc., Wilmington, DE (US)

(21) Appl. No.: 10/044,506

(22) Filed: Jan. 11, 2002

Related U.S. Patent Documents

Reissue of:
(64) Patent No.: 6,246,220
Issued: Jun. 12, 2001
Appl. No.: 09/633,316
Filed: Aug. 7, 2000

U.S. Applications:
(60) Provisional application No. 60/151,826, filed on Sep. 1, 1999.

(51) Int. Cl.[7] ..... G05F 1/613
(52) U.S. Cl. ..... 323/224; 323/283; 323/288
(58) Field of Search ..... 323/224, 283, 323/288, 284

(56) References Cited

U.S. PATENT DOCUMENTS 5,134,355 A 7/1992 Hastings
5,912,552 A 6/1999 Tateishi
6,107,786 A * 8/2000 Brown ..... 323/224
6,166,528 A * 12/2000 Rossetti et al. ..... 323/283
6,229,289 B1 * 5/2001 Piovaccari et al. ..... 323/268
6,288,524 B1 * 9/2001 Tsujimoto ..... 323/282
6,396,252 B1 * 5/2002 Culpepper et al. ..... 323/225
6,456,050 B1 * 9/2002 Agiman ..... 323/282

* cited by examiner

*Primary Examiner*—Shawn Riley
(74) *Attorney, Agent, or Firm*—Fogg and Associates, LLC; David N. Fogg

(57) ABSTRACT

A DC to DC buck pulse width modulator converter circuit includes an input, a high side output and a low side output. A high side switch is electrically connected between a common output node and a voltage supply, and controls a flow of current therethrough dependent upon the high side output. A low side switch is electrically connected between the common output node and ground, and controls a flow of current therethrough dependent upon the low side output. A virtual ground amplifier includes a second input electrically connected to ground. A current feedback resistor is electrically connected intermediate the common output node and a first input of the virtual ground amplifier. A variable impedance component is electrically connected to an output of the virtual ground amplifier and to the first input of the virtual ground amplifier. The impedance of the variable impedance component is varied dependent upon the output of the virtual ground amplifier. A sample and hold circuit is electrically connected intermediate the input of the pulse width modulator converter circuit and the variable impedance component. The sample and hold circuit sources a virtual ground current through the variable impedance component, and samples the virtual ground current.

36 Claims, 5 Drawing Sheets

SYNCHRONOUS-RECTIFIED DC TO DC CONVERTER WITH IMPROVED CURRENT SENSING

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Patent Application Ser. No. 60/151,826, filed Sep. 1, 1999.

*This reissue application, U.S. Ser. No. 10/044,506 is the parent of Reissue Continuation application Ser. No. 10/282, 753, filed Oct. 29, 2002.*

FIELD OF THE INVENTION

A synchronous buck DC to DC converter typically employs a pair of switches arranged to connect one end of an inductor to either an input supply voltage or to ground. The second end of the inductor is attached to a load. It is well known to use field effect transistors (FET's) as these switches. Load current flows from the supply through the upper FET and the inductor while that FET is on, and from ground through the lower FET and the inductor while that FET is on.

It is desirable to sense the value of the load current to perform various functions such as, for example, to deliberately decrease the output voltage as load current increases (i.e., output voltage "droop"), to provide for current limiting or over-current trip to protect the load and the converter components, and in order to balance the output current being sourced by each channel in a multi-channel or multi-phase converter. The load current can be sensed through determining the DC resistance of the inductor and sensing the voltage drop across that DC resistance, or by sensing the voltage drop across an added series sense resistor. The load current can also be detected by sensing the voltage drop caused by the load current flowing through the upper FET switch. However, each of these methods has their disadvantages. Sensing the load current by using the DC resistance of the inductor requires adding an R-C filter across the inductor to remove the AC component of the current. Thus, additional components are required and extra cost incurred. Adding a series sense resistor also requires an extra component, increases cost, and reduces system efficiency. Furthermore, sensing the voltage drop across the drain-to-source resistance of the upper FET when it is conducting has often proven to be impractical, since the "on" time of that switch is typically very short.

Therefore, what is needed in the art is a DC/DC converter with improved current sensing. Furthermore, what is needed in the art is an apparatus and method which enables the sensing of load current in a DC/DC converter by sensing the voltage drop across the drain-to-source resistance of a switching FET.

Moreover, what is needed in the art is an apparatus and method which enables sensing and detection of overcurrent in a DC/DC converter.

SUMMARY OF THE INVENTION

The present invention provides a power supply with improved current sensing.

The invention comprises, in one form thereof, a DC to DC buck pulse width modulator converter circuit having an input, a high side output and a low side output. A high side switch is electrically connected between a common output node and a voltage supply, and controls a flow of current therethrough dependent upon the high side output. A low side switch is electrically connected between the common output node and ground, and controls a flow of current therethrough dependent upon the low side output. A virtual ground amplifier includes a second input electrically connected to ground. A current feedback resistor is electrically connected intermediate the common output node and a first input of the virtual ground amplifier. A variable impedance component is electrically connected to an output of the virtual ground amplifier and to the first input of the virtual ground amplifier. The impedance of the variable impedance component is varied dependent upon the output of the virtual ground amplifier. A sample and hold circuit is electrically connected intermediate the input of the pulse width modulator converter circuit and the variable impedance component. The sample and hold circuit sources a virtual ground current through the variable impedance component, and samples the virtual ground current.

An advantage of the DC/DC converter or the present invention is that it provides an improved method and apparatus to measure the voltage drop across the drain-to-source resistance of a FET having a very brief "on" time.

Another advantage of the DC/DC converter of the present invention is that the amount of droop in the output voltage in response to a change in load current is easily manipulated and scaled by selecting an appropriate value for the voltage feedback resistor.

Yet another advantage of the DC/DC converter of the present invention is that the sensitivity or magnitude of the current limiting or trip is easily manipulated or scaled by selecting an appropriate value for the voltage feedback resistor.

A still further advantage of the DC/DC converter of the present invention is that a broad range of load current and component values is accommodated by selecting an appropriate value for the current feedback resistor.

BRIEF DESCRIPTION OF THE DRAWINGS

The above-mentioned and other features and advantages of this invention, and the manner of attaining them, will become apparent and be better understood by reference to the following description of embodiments of the invention in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE DRAWINGS

Figure 1:
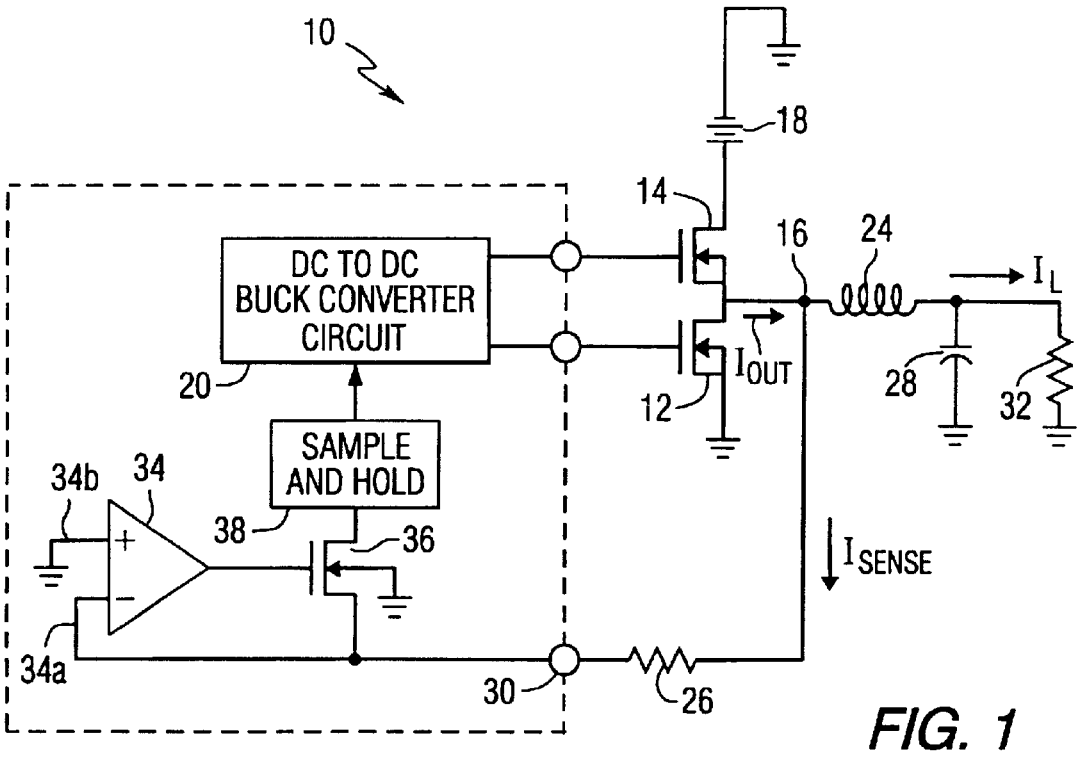
FIG. 1 is a high-level schematic and functional diagram of one embodiment of the DC/DC converter of the present invention.

Referring now to the drawings, and particularly to FIG. 1, there is shown one embodiment of a DC/DC converter of the present invention. DC/DC converter 10 includes low side field effect transistor (FET) 12 and high side FET 14. The drain of low side FET 12 is electrically connected to the source of high side FET 14 at common output node 16. The drain of high side FET 14 is connected to power supply 18. The source of low side FET 12 is electrically connected to ground. Each gate terminal of low side FET 12 and high side FET 14 is electrically connected to a respective output (not referenced) of buck converter circuit 20. Inductor 24 and current feedback resistor 26 are each electrically connected to common output node 16, and thus to the drain of FET 12 and source of FET 14. More particularly, inductor 24 is electrically connected between common output node 16 and load reservoir capacitor 28, and current feedback resistor 26 is electrically interconnected between common output node 16 and virtual ground circuit node 30. A load 32, schematically represented as a resistor, is electrically connected in parallel with load reservoir capacitor 28.

Virtual ground amplifier 34 has its inverting input 34a electrically connected to virtual ground circuit node 30 and its non-inverting input 34b connected to ground. Output 34c of virtual ground amplifier 34 is electrically connected to and drives the gate of FET 36. The source of FET 36 is electrically connected to virtual ground circuit node 30. The drain of FET 36 is electrically connected to sample and hold circuit 38. Thus, as will be apparent to one skilled in the art, virtual ground amplifier 34 and FET 36 are configured to continuously drive virtual ground circuit node 30 toward ground potential. With virtual ground circuit node 30 being continuously driven towards ground potential, the end of current feedback resistor 26 that is connected to circuit node 30 will be at ground potential and the end connected to common output node 16 will have a negative voltage. This negative voltage at the end of current feedback resistor 26 that is connected to common output node 16 will be equal to the product of output current $I_{OUT}$ and the on-state resistance that exists between the drain and source ($RDS_{ON}$) of low side FET 12. Current $I_{SENSE}$ flows through current feedback resistor 26 and has a magnitude determined by the ratio of $RDS_{ON}$ of low side FET 12 to the value of current feedback resistor 26. Thus, $I_{SENSE}$ is the product of output current $I_{OUT}$ and the ratio of $RDS_{ON}$ of low side FET 12 to current feedback resistor 26, and as such is representative of output current $I_{OUT}$. Load current $I_L$ is the current flowing through inductor 24 and is substantially equal to output current $I_{OUT}$ minus $I_{SENSE}$. Typically, since the ratio of $RDS_{ON}$ to the value of current feedback resistor 26 is relatively small, $I_{SENSE}$ is substantially smaller than output current $I_{OUT}$. Therefore, output current $I_{OUT}$ and load current $I_L$ will be of substantially similar magnitudes and thus $I_{SENSE}$ will also be representative of load current $I_L$.

The value of current feedback resistor 26 is selected to provide a convenient value of current flow for the values of load current $I_L$ and/or the value of $RDS_{ON}$ of low side FET 12. Thus, the sensitivity or magnitude of, for example, the voltage droop, current limiting or trip, and current balancing incorporated into DC/DC converter 10 is scaled by selecting the value of current feedback resistor 26 relative to the value of $RDS_{ON}$ of low side FET 12. Furthermore, the voltage drop across $RDS_{ON}$ of low side FET 12, which is usually negative, is accommodated in DC/DC converter 10 without the need for a negative voltage supply.

Figure 2:
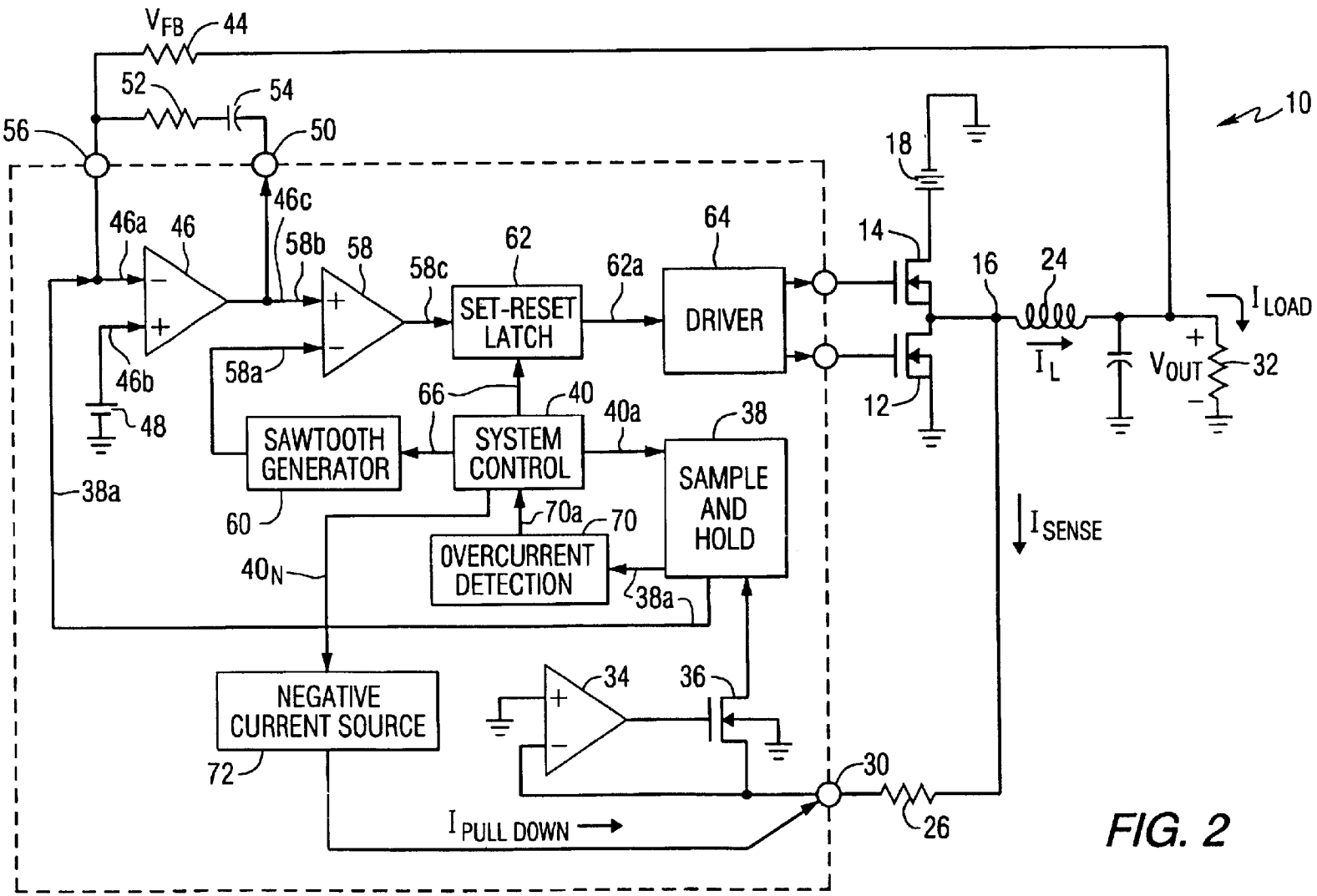
FIG. 2 is a detailed schematic and functional diagram of the DC/DC converter of FIG. 1.

Referring now to FIG. 2, a system control circuit 40 is electrically connected to sample and hold circuit 38. As stated hereinabove, the drain of FET 36 connects to sample and hold circuit 38. The current supplied by the source of FET 36 flows from sample and hold circuit 38 into the drain of FET 36, out the source of FET 36, and into virtual ground circuit node 30. Also flowing into virtual ground circuit node 30, from the opposite direction, is $I_{SENSE}$ which, as stated above, is representative of load current $I_L$. In order to hold virtual ground circuit node 30 at ground potential, virtual ground amplifier 34, via output 34c, adjusts the current flowing through FET 36 and into virtual ground circuit node 30 to be substantially equal to $I_{L\ SENSE}$. Since $I_{SENSE}$ is representative of the load current $I_L$, the current flowing through FET 36 and into virtual ground circuit node 30, as controlled by virtual ground amplifier 34 and FET 36, is also representative of load current $I_L$. System control circuit 40 periodically issues control signal 40a to sample and hold circuit 38. Control signal 40a is issued when FET 36 is in the on or conducting condition. In response to control signal 40a, sample and hold circuit 38 samples the current flowing through FET 36 when FET 36 is in the on condition and holds the sampled value. Thus, the sampled value acquired by sample and hold circuit 38 is also representative of load current $I_L$. Sample and hold circuit 38 issues sample signal 38a which is representative of the sampled value of current flowing through FET 36.

DC/DC converter 10 monitors the voltage $V_{OUT}$ across load 32 through voltage feedback resistor 44. Voltage feedback resistor 44 is connected at one end to load 32 and at the other end to inverting input 46a of error amplifier 46. $V_{FB}$ is the voltage across voltage feedback resistor 44. The non-inverting input 46b of error amplifier 46 is electrically connected to reference voltage supply 48, which provides a predetermined voltage that is substantially equal to the desired output voltage of DC/DC converter 10. Error amplifier 46 regulates the voltage at inverting input 46a to be substantially equal to the voltage from reference voltage supply 48. Since the voltage at inverting input 46a is substantially equal to the sum of $V_{OUT}$ and $V_{FB}$, error amplifier 46 acts to regulate the sum of $V_{OUT}$ and $V_{FB}$ to be substantially equal to the voltage from reference voltage supply 48. Output 46c of error amplifier 46 is electrically connected to compensation circuit node 50. A feedback path between output 46c and inverting input 46a of error amplifier 46 includes compensation resistor 52 and compensation capacitor 54. More particularly, connected to compensation circuit node 50 is one end of compensation capacitor 54 which, in turn, is connected at its other end to compensation resistor 52. Compensation resistor 52, at the end thereof opposite to compensation capacitor 54, is connected to summing node 56. Compensation resistor 52 and capacitor 54 in the voltage feedback path provide system stability and control system response.

Figure 4:
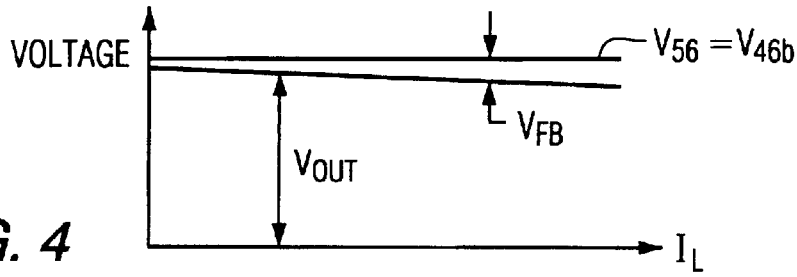
FIG. 4 is a diagram of a node voltage versus load current of the DC/DC converter of FIG. 2.

Sample signal 38a, which is issued by sample and hold circuit 38 and is representative of load current $I_L$, is also connected to the inverting input of error amplifier 46. There is no other path for direct current at inverting input 46a of error amplifier 46 except through voltage feedback resistor 44. Thus, the voltage across voltage feedback resistor 44, i.e., $V_{FB}$, is modified by sampling signal 38a. As stated above, error amplifier 46 regulates the voltage at its inverting input 46a, which is equal to the sum of $V_{OUT}$ and $V_{FB}$, to be substantially equal to the reference voltage supply 48. Thus, for example, as sampling signal 38a increases $V_{FB}$ increases proportionally and error amplifier 46 reduces $V_{OUT}$ to maintain the voltage at inverting input 46a to be equal to reference voltage supply 48. Since sampling signal 38a is representative of load current $I_L$, $V_{OUT}$ is in effect modulated in an inversely proportional manner relative to load current $I_L$. Thus, as shown in FIG. 4, $V_{OUT}$ is varied or droops dependent at least in part upon load current $I_L$. By selecting the value of feedback resistor 44, the amount of variation or droop in $V_{OUT}$ relative to load current $I_L$ is controlled.

Inverting input 58a of comparator 58 is electrically connected to sawtooth generator 60, and receives therefrom a sawtooth waveform having predetermined characteristics. Output 58c of comparator 58 is electrically connected to set-reset (SR) latch 62. Output 62a of SR latch 62 is electrically connected to and buffered by driver 64 which, in turn, drives low side FET 12 and high side FET 14. DC/DC converter 10 is configured, for example, such that a high-level signal at output 62a of SR latch 62 turns low side FET 12 off and turns on high side FET 14. Sawtooth generator 60 receives sync pulse 66 from system control circuit 40. SR latch 62 also receives sync pulse 66.

Error amplifier 46 produces at output 46c a signal that is representative of the actual output voltage $V_{OUT}$ relative to, such as, for example, subtracted from or added to, the voltage of reference voltage supply 48, which represents the desired output voltage of DC/DC converter 10. For example, output 46c of error amplifier 46 produces a signal that is more negative, or increases in a negative direction, as $V_{OUT}$ increases above the voltage of reference voltage supply 48. Conversely, and as a further example, error amplifier 46 produces at output 46c a signal having a decreasingly negative magnitude (i.e., a more positive magnitude) as $V_{OUT}$ decreases below the voltage of reference voltage supply 48. Output 46c of error amplifier 46 is electrically connected to the non-inverting input of comparator 58. Comparator 58 compares the sawtooth waveform electrically connected to its inverting input 58a with output 46c of error amplifier 46 which is electrically connected to its noninverting input 58b. Output 58c of comparator 58 is active, such as, for example, high during the time that the sawtooth waveform generated by sawtooth generator 60 is less positive than output 46c of error amplifier 46.

Figure 3A:
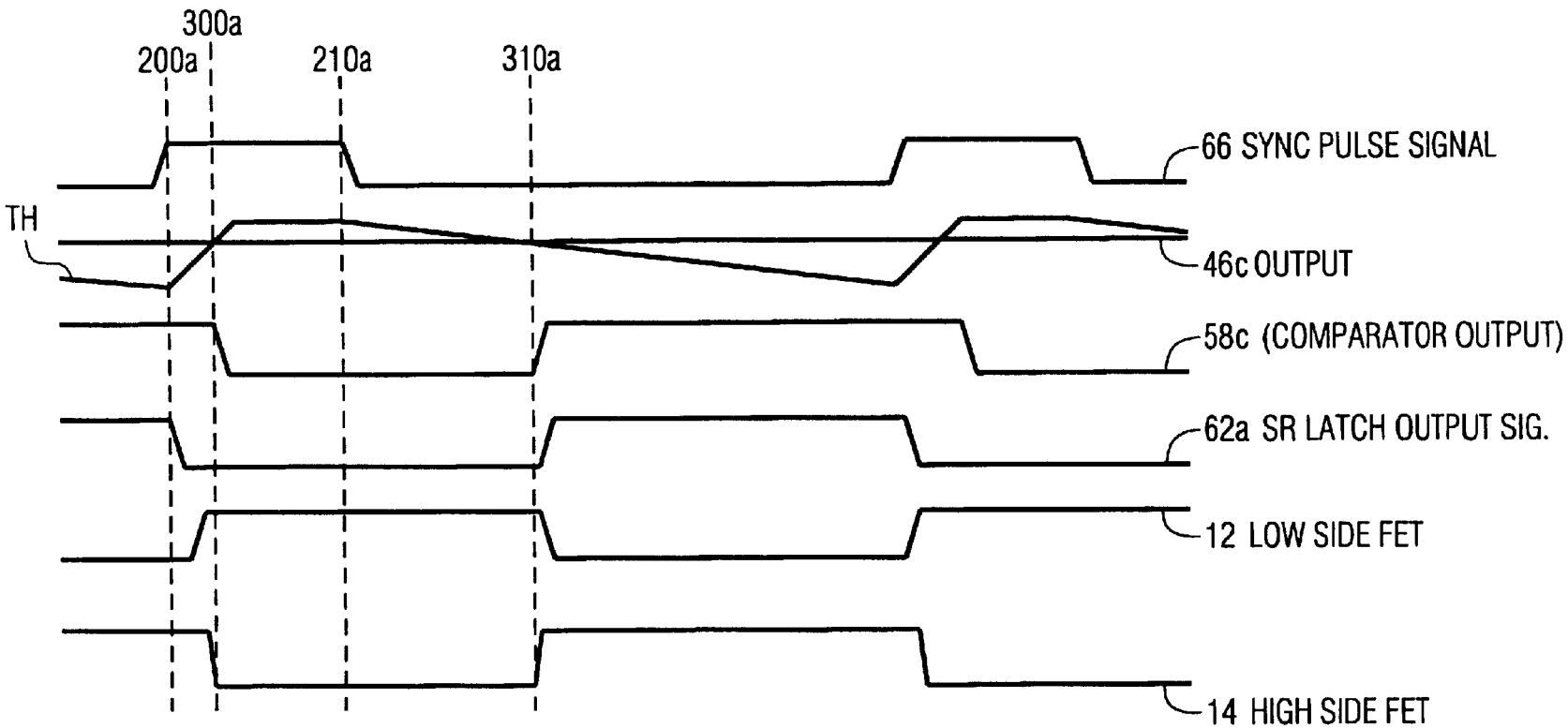
FIGS. 3a and 3b are timing diagrams illustrating the operation of the DC/DC converter of FIG. 2.

Referring to FIG. 3a, the condition of output voltage $V_{OUT}$ being less than the desired output voltage, or less than the voltage of reference voltage supply 48, is illustrated. Thus, output 46c of error amplifier 46 is relatively high, thereby placing a relatively high signal at noninverting input 58b of comparator 58. At least a substantial portion of the period of the sawtooth waveform will be less positive than the relatively high-level signal present at noninverting input 58b. Output 58c of comparator 58 is active, such as, for example, high, during that substantial portion of the period for which the sawtooth waveform has a value that is less positive than the relatively high signal present at noninverting input 58b. Thus, the pulse width of output 58c will be relatively wide, or alternatively the active period of output 58c will be relatively long in duration, when $V_{OUT}$ is less than the voltage of reference voltage supply 48.

Figure 3B:
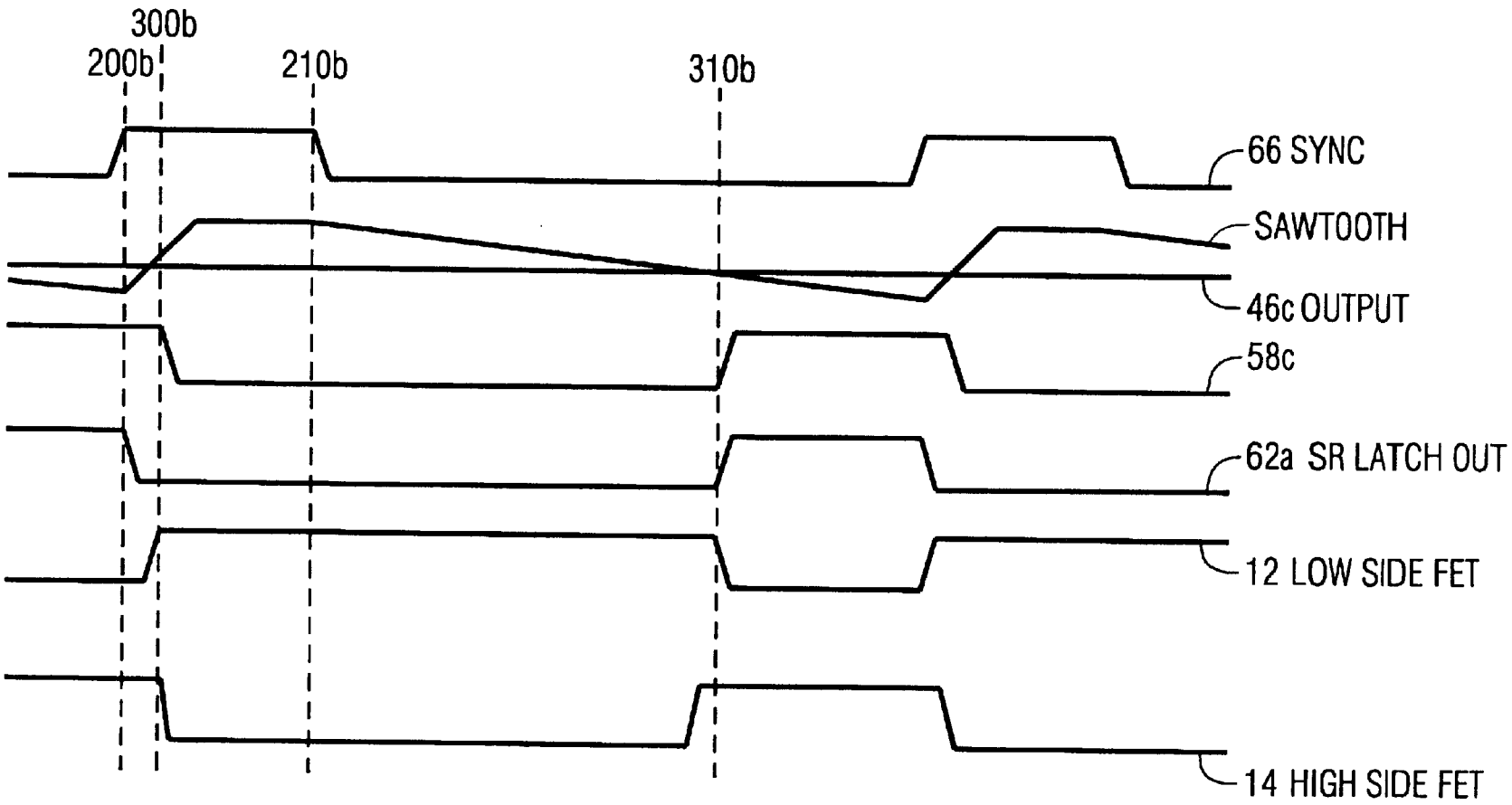

Conversely, and with particular reference to FIG. 3b, output 46c of error amplifier 46 is relatively low when $V_{OUT}$ is greater than the voltage of reference voltage supply 48. This condition places a relatively low-level signal at non-inverting input 58a of comparator 58. A relatively small portion of the period of the sawtooth waveform will be less positive than the relatively low-level signal present at non-inverting input 58b. Output 58c of comparator 58 will be active during only that relatively small portion, if any, of the period of the sawtooth waveform (e.g., the lowest points or bottom peaks) which is less positive than the relatively low signal at noninverting input 58b. Thus, the pulse width of output 58c will be relatively narrow, or alternatively the active period of output 58c will be relatively short in duration, when $V_{OUT}$ is greater than the voltage of reference voltage supply 48.

When output 58c is active, output 62a of SR latch 62 is set, such as, for example, high. Conversely, when output 58c is not active, output 62a of SR latch 62 is reset, such as, for example, low. Thus, when the sawtooth waveform is more positive than the voltage level of reference voltage supply 48, output 62a of SR latch 62 is reset, i.e., low. Output 62a of SR latch 62 is set, i.e., high, when the sawtooth waveform drops below the predetermined voltage. Output 62a of SR latch 62 is electrically connected to and buffered by driver 64 which, in turn, drives low side FET 12 and high side FET 14. DC/DC converter 10 is configured such that, for example, a high or set condition on output 62a of SR latch 62 results in driver 64 turning off low side FET 12 and turning on high side FET 14.

Current tripping or over current protection is provided by overcurrent detection circuit 70. Overcurrent detection circuit 70 compares the sample signal 38a to a reference current (not shown) and issues overcurrent signal 70a to system control circuit 40 when sample signal 38a exceeds the reference current. System control 40 responds to overcurrent signal 70a by shutting down DC/DC converter 10. System control 40 is configured, for example, to restart the operation of DC/DC converter 10 after a predetermined amount of time.

Negative current source 72 is electrically connected intermediate system control 40 and virtual ground circuit node 30. Load current $I_L$ becomes negative under certain operating conditions, such as, for example, when load current $I_L$ has a low average value and the sawtooth waveform created due to the switching of voltage across inductor 24 dips to a negative value. During such operating conditions, i.e., when $I_L$ is negative, the voltage at the drain of low side FET 12 is positive. The positive voltage on the drain of low side FET 12 results in the sourcing of current through resistor 26 and into virtual ground circuit node 30, thereby driving virtual ground circuit node 30 to a positive potential. Negative current source 72 sources $I_{PULL\ DOWN}$ into virtual ground circuit node 30 in response to signal $\mathbf{40}_N$, and thereby maintains virtual ground node 30 at ground potential under the conditions when $I_L$ is negative. Thus, virtual ground amplifier 46, variable impedance component 36 and sample and hold circuit 38 are not required to operate in a bi-directional manner (i.e., they source current in one direction only) and the need to include a negative voltage supply in DC/DC converter 10 is eliminated.

Figure 5:
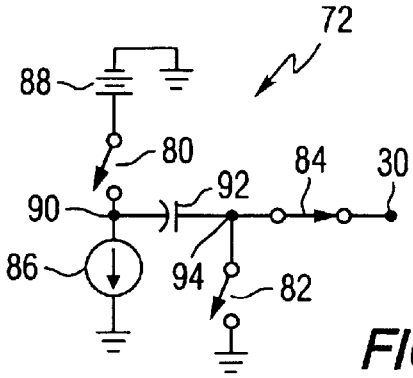
FIG. 5 is a schematic of a negative current source for use with the DC/DC converter of FIG. 2.

As best shown in FIG. 5, a negative current source 72 includes switches 80, 82 and 84. Each of switches 80, 82 and 84 are, for example, MOS transistors. Current source 86 is a pull down current source, such as, for example, an NMOS mirror, and is electrically connected intermediate ground and node 90. Switch 80 is electrically connected intermediate node 90 and voltage supply 88, and selectively connects node 90 to voltage supply 88. Capacitor 92 is electrically interconnected between node 90 and node 94. Each of switch 82 and 84 have a first side electrically connected to node 94. The other side of switch 82 is electrically connected to ground, while the other side of switch 84 is electrically connected to virtual ground circuit node 30. Switches 80 and 82 are closed and switch 84 is open when the reverse current sourced by current source 86 is not required to maintain virtual ground circuit node 30 at ground potential, such as, for example, when low side FET 12 is off. The supply voltage of voltage supply 88 is thus stored across capacitor 92, with node 90 having a positive potential and node 94 having a negative potential. In order to source pull down current from current source 86, switches 80 and 82 are each opened and switch 84 is closed. Thus, $I_{PULL\ DOWN}$ flows into virtual ground node 30 in the same direction as normal forward current induced by the voltage drop on low side FET 12. The addition of current $I_{PULL\ DOWN}$ maintains virtual ground circuit node 30 at ground potential, and is optionally subtracted out later so as not to affect subsequent circuit operation, such as, for example, the current limit trip point.

In use, and with continued reference to FIGS. 3a and 3b, the sequence of operation of DC/DC converter 10 is as follows. Sawtooth generator 60 receives sync pulse 66 from system control circuit 40. SR latch 62 also receives sync pulse 66. Sync pulse resets both the sawtooth waveform and output 62a of SR latch 62 to low levels. SR latch 62 is configured to reset output 62a based upon sync pulse 66, regardless of the condition or state of the output of comparator 58. Thus, if the output of comparator 58 is, for example, continuously higher than the sawtooth waveform, output 62a of SR latch 62 will be low during a high level of sync pulse 66. As shown in FIGS. 3a and 3b at points 200a and 200b, respectively, sync pulse 66 resets the sawtooth waveform generated by sawtooth generator 60 to a low level, and resets output 62a of SR latch 62. DC/DC converter 10 is configured such that, for example, when output 62a of SR latch 62 is low, high side FET 14 is off and low side FET 12 is on. Thus, the resetting of output 62a of SR latch 62 by sync pulse 66 turns on low side FET 12. During this time period, i.e., when low side FET 12 is on, $RDS_{ON}$ of low side FET 12 is measured. At the trailing edge of sync pulse 66, at points 210a and 210b, respectively, the sawtooth waveform begins to slope downward (i.e. has a negative slope).

Referring now particularly to FIG. 3a, the condition of DC/DC converter 10 having an output voltage $V_{OUT}$ that is lower than the desired or target level is illustrated. Thus, the voltage across load 32 is lower than desired. This condition results in output 46c of error amplifier 46 having a high level relative to the sawtooth waveform. At point 300a, the leading, or positively sloped, edge of the sawtooth waveform crosses above the output level of output 46c of error amplifier 46, thereby sending output 58c of comparator 58 low. This particular transition in output 58c does not affect output 62a of SR latch 62 since sync pulse 66 is still active, and thus output 62a remains reset or low.

At point 310a, the trailing, or negatively sloped, edge of the sawtooth waveform crosses below the output level of output 46c of error amplifier 46, thereby sending output 58c of comparator 58 high. This transition in output 58c to a high level, in turn, sets output 62a of SR latch 62 high thereby turning high side FET 14 on and turning off low side FET 12. The high level of output 46c relative to the sawtooth waveform results in the sawtooth waveform dropping below the level of output 46c (at point 310a) relatively early in the period of the sawtooth waveform. Thus, points 300a and 310a are relatively close in time, and, therefore, the period of time during which low side FET 12 is off is correspondingly brief. Conversely, the period of time during which high side FET 14 is on and sourcing current is relatively long. Thus, high side FET 14 is on for a relatively long period of time and sources a greater amount of current to load 32 when $V_{OUT}$ is less than the desired output voltage.

Referring now FIG. 3b, the condition of DC/DC converter 10 having an output voltage that is higher than the desired or target voltage level is shown. Thus, the voltage across load 32 is greater than desired. The output of error amplifier 46 is therefore low relative to the sawtooth waveform. At point 300b, the leading, or positively sloped, edge of the sawtooth waveform crosses above the output level of output 46c of error amplifier 46, thereby sending output 58c of comparator 58 low. Output 62a of SR latch 62 has previously been reset by sync pulse 66.

At point 310b, the trailing, or negatively sloped, edge of the sawtooth waveform crosses below the output level of output 46c of error amplifier 46, thereby sending output 58c of comparator 58 high. This transition in output 58c to a high level, in turn, sets output 62a of SR latch 62 high thereby turning high side FET 14 on and turning off low side FET 12. The low level of output 46c relative to the sawtooth waveform results in the sawtooth waveform dropping below the level of output 46c (at point 310b) relatively late in the period of the sawtooth waveform. Thus, points 300a and 310a are separated by a substantially greater amount of time relative to the situation illustrated in FIG. 3a (i.e., when output 46c is high relative to the saw tooth waveform and/or when $V_{OUT}$ is less than the target value). Therefore, the period of time during which low side FET 12 is on is of a correspondingly longer duration. Conversely, the period of time during which high side FET 14 is on and sourcing current is relatively brief. Therefore high side FET 14 sources a lesser amount of current to load 32 when $V_{OUT}$ is greater than the desired output voltage.

In both cases, i.e., whether the voltage across load 32 is higher or lower than desired, output 62a of SR latch 62 goes low based upon sync pulse 66 rather than dependent upon the relative value of the voltage across load 32. Output 62a of SR latch 62 remains low at least during the duration of sync pulse 66. When output 62a of SR latch 62 is in the low state, high side FET 14 is in the off condition and low side FET 12 is in the on condition, and the voltage drop across $RDS_{ON}$ of low side FET 12 is sampled and held. However, when low side FET 12 is in the on condition the direction of load current $I_L$ is toward load 32. Thus, load current $I_L$ flows from ground through the source to the drain of low side FET 12 when low side FET 12 is in the on condition. This direction of current flow through low side FET 12 develops a negative voltage on the drain of low side FET 12. The magnitude of this negative voltage is the product of $I_L$ and the $RDS_{ON}$ of low side FET 12.

Figure 6:
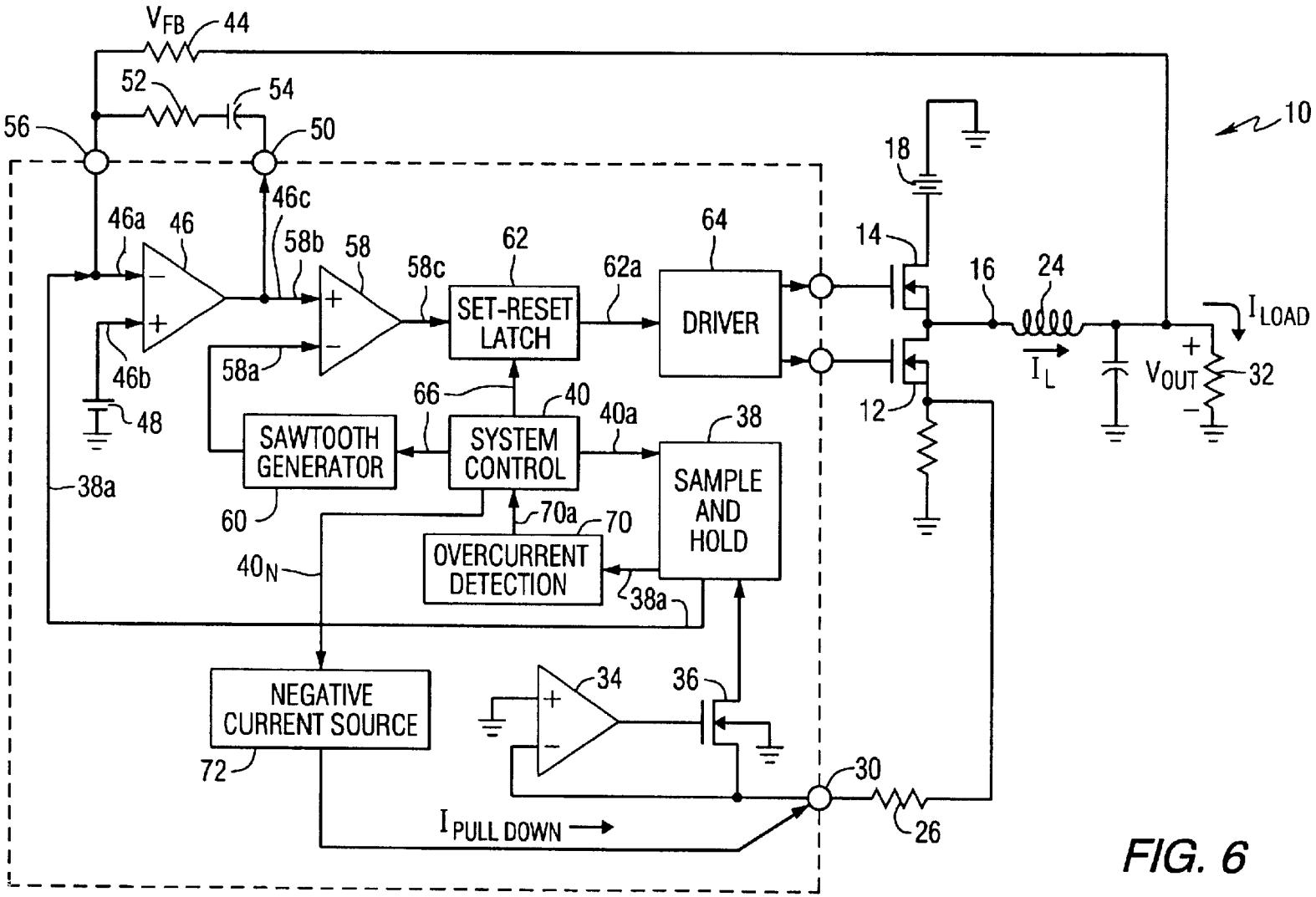
FIG. 6 is a detailed schematic of a second embodiment of a DC/DC converter of the present invention.

In the embodiment shown, the source of low side FET 12 is electrically connected to ground. However, it is to be understood that low side FET 12 can be alternately configured, such as, for example, having its source tied through a resistor to ground, and electrically connecting sensing resistor 26 to the source of low side FET 12. The net effect is the same, and the virtual ground amplifier continues to drive virtual ground node 30 to virtual ground. In this alternative configuration, current from Sample and Hold circuit 38 is still representative of load current $I_L$ except the load-current-induced voltage drop across the added sense resistor is measured rather than the voltage drop across $RDS_{ON}$ of low side FET 12. This alternative embodiment is best shown in FIG. 6.

In the embodiment shown, reference voltage supply 48 is described as a fixed voltage supply. However, it is to be understood that reference voltage supply 48 can be alternatively configured, such as, for example, as a bandgap or other fixed voltage source, or may be configured as a Digital to Analog converter or other variable voltage source.

In the embodiment shown, FET 36 is configured as an FET. However, it is to be understood that FET 36 can be alternately configured, such as, for example, an NPN transistor, with Base substituted for Gate, Emitter for Source, and Collector of Drain.

In the embodiment shown, virtual ground amplifier 34 is configured for continuous operation. However, it is to be understood that virtual ground amplifier 34 can be alternately configured, such as, for example, an auto-zeroed amplifier or other non-continuously operating amplifier, as it is needed only when low side FET 12 is in the on state.

In the embodiment shown, DC/DC converter 10 is configured such that a high-level signal at output 62a of SR latch 62 turns low side FET 12 off and turns on high side FET 14. However, it is to be understood that DC/DC converter 10 can be alternately configured such that the operational polarity of FET 12 and FET 14 is reversed.

In the embodiment shown, system control circuit 40 is configured to restart the operation of DC/DC converter 10 after a predetermined amount of time following the detection of an overcurrent condition. However, it is to be understood that system control circuit 40 may be alternately configured, such as, for example, to issue a visual or audible warning signal or to completely shut down DC/DC converter 10.

In the embodiment shown, DC/DC converter 10 is configured with inductor 24, load capacitor 28 and load 32 connected to node 16. However, it is to be understood that DC/DC converter 10 can be alternately configured, such as, for example, without inductor 24, load capacitor 28 and load 32 such that a user, designer, or manufacturer can choose and customize circuitry attached to node 16 of DC/DC converter 10.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A power supply, comprising:

a DC to DC buck pulse width modulator converter circuit having an input, a high side output and a low side output;

a high side switch electrically connected intermediate a common output node and a voltage supply, said high side switch configured for controlling a flow of current therethrough dependent at least in part upon said high side output;

a low side switch electrically connected intermediate said common output node and ground, said low side switch configured for controlling a flow of current therethrough dependent at least in part upon said low side output;

a virtual ground amplifier having a first input, a second input and an output, said second input electrically connected to ground potential;

a current feedback resistor electrically connected intermediate said common output node and said first input of said virtual ground amplifier;

a variable impedance component electrically connected to said output of said virtual ground amplifier, and to said first input of said virtual ground amplifier, said variable impedance component configured to vary in impedance dependent at least in part upon said output of said virtual ground amplifier; and a sample and hold circuit electrically connected intermediate said DC to DC buck pulse width modulator converter circuit and said variable impedance component, said sample and hold circuit configured to source a virtual ground current through said variable impedance component and to sample and hold said virtual ground current.

2. The power supply of claim 1, further comprising a system control circuit, said system control circuit electrically coupled to said sample and hold circuit, said system control circuit issuing a first control signal, said sample and hold circuit being configured to sample and hold said virtual ground current in response to said first control signal, said sample and hold circuit issuing a sample signal dependent at least in part upon said virtual ground current, said system control circuit selectively activating and deactivating at least one of said high side switch and said low side switch dependent at least in part upon said sample signal.

3. The power supply of claim 2, wherein said system control circuit issues a sync signal, said sync signal resetting at least one of said high side switch and said low side switch.

4. The power supply of claim 2, further comprising an overcurrent detector circuit electrically coupled to said sample and hold circuit and to said system control circuit, said overcurrent detector circuit configured for issuing an overcurrent signal when said sample signal exceeds a predetermined threshold.

5. The power supply of claim 4, wherein said system control circuit is configured for shutting down said DC to DC buck pulse width modulator converter circuit in response to said overcurrent signal.

6. The power supply of claim 5, wherein said system control circuit is configured to restart said DC to DC buck pulse width modulator converter circuit a predetermined period of time after receiving said overcurrent signal.

7. The power supply of claim 2, further comprising a power supply output, a voltage feedback resistor electrically connected intermediate said power supply output and said input of said DC to DC buck pulse width modulator converter circuit.

8. The power supply of claim 7, wherein said system control circuit includes a current mirror, said current mirror sourcing a droop current, said droop current being dependent at least in part upon said virtual ground current, said droop current being electrically coupled to said input of said DC to DC buck pulse width modulator converter circuit to modify a feedback voltage across said voltage feedback resistor and thereby adjust an output voltage of said power supply dependent at least in part upon said droop current.

9. The power supply of claim 1, further comprising a negative current source, said system control circuit issuing a second control signal, said second control signal being electrically coupled to said negative current source, said negative current source sourcing a negative current in response to said second control signal, said negative current flowing into said first input of said virtual ground amplifier to thereby connect said current feedback resistor to ground when current through said current feedback resistor is negative.

10. The power supply of claim 1, wherein said variable impedance component comprises one of a field effect transistor and an NPN-type transistor.

11. The power supply of claim 1 further comprising an inductor having a first end and a second end, said first end electrically connected to said common output node, said second end configured for being electrically connected to a load.

[12. A method of sensing an output current in a power supply, said power supply comprising a DC to DC buck pulse width modulator converter circuit having an input, a high side output and a low side output, said method comprising the steps of:

electrically connecting a high side switch intermediate a common output node and a voltage supply, said high side switch configured for controlling a flow of current therethrough dependent at least in part upon said high side output;

a low side switch electrically connected intermediate said common output node and ground, said low side switch configured for controlling a flow of current therethrough dependent at least in part upon said low side output;

directing a sensed current to a virtual ground node, said sensed current comprising a known portion of the output current when said low side switch is in an on condition, said sensed current flowing into said virtual ground node in a first direction;

sourcing a virtual ground current into said virtual ground node, said virtual ground current flowing into said virtual ground node in a second direction, said second direction being opposite to said first direction, said virtual ground current being substantially equal to said sensed current and thereby canceling said sensed current at said virtual ground node; and sampling and holding a value of said virtual ground current.]

[13. The method of claim 12, comprising the further step of selectively activating and deactivating at least one of said high side switch and said low side switch dependent at least in part upon said sampling and holding step.]

[14. The method of claim 12, comprising the further step of selectively activating and deactivating at least one of said high side switch and said low side switch on at least one of a periodic and a random basis.]

[15. The method of claim 12, comprising the further steps of:

comparing said sampled and held value of said virtual ground current to a predetermined maximum limit; and shutting down said power supply when said virtual ground current exceeds said predetermined maximum limit.]

[16. The method of claim 15, comprising the further step of restarting said power supply a predetermined period of time after said shutting down step.]

[17. The method of claim 12, comprising the further step of adjusting an output voltage of said power supply dependent at least in part upon said sampled and held value of said virtual ground current.]

18. A power supply, comprising:

a DC to DC buck pulse width modulator converter circuit having an input, a high side output and a low side output;

a high side switch electrically connected intermediate a common output node and a voltage supply, said high side switch configured for controlling a flow of current therethrough dependent at least in part upon said high side output;

a low side switch electrically connected to said common output node and to ground through a sense resistor, said low side switch configured for controlling a flow of current therethrough dependent at least in part upon said low side output;

a virtual ground amplifier having a first input, a second input and an output, said second input electrically connected to ground potential;

a current feedback resistor electrically connected intermediate said sense resistor and said first input of said virtual ground amplifier;

a variable impedance component electrically connected to said output of said virtual ground amplifier, and to said first input of said virtual ground amplifier, said variable impedance component configured to vary in impedance dependent at least in part upon said output of said virtual ground amplifier; and a sample and hold circuit electrically connected intermediate said DC to DC buck pulse width modulator converter circuit and said variable impedance component, said sample and hold circuit configured to source a virtual ground current through said variable impedance component and to sample and hold said virtual ground current.

*19. A control apparatus for DC/DC converter, comprising:*

*a converter circuit having an input, a high side output adapted to drive a high side circuit and a low side output adapted to drive a low side circuit;*

*at least one current sense node that is adapted to receive a current signal when the low side circuit is in an on condition;*

*an amplifier having at least one input coupled to the at least one current sense node and having an output;*

*a variable impedance component coupled to the output of the amplifier, the variable impedance component configured to vary in impedance dependent at least in part upon the output of the amplifier; and*

*a sample and hold circuit coupled to the converter circuit, wherein the sample and hold circuit is configured to sample and hold a current sourced through the variable impedance component.*

*20. The control apparatus of claim 19, wherein the variable impedance component comprises a transistor with an input coupled to the output of the amplifier.*

*21. The control apparatus of claim 19, wherein the amplifier has two inputs, the first input coupled to the current sense node and the second input coupled to a reference.*

*22. The control apparatus of claim 19, wherein the variable impedance component comprises a transistor with a first node coupled to the output of the amplifier, a second node coupled to the current sense node and a third node coupled to the sample and hold circuit.*

*23. A power supply, comprising:*

*a converter circuit having an input, a high side output and a low side output;*

*a high side switch coupled to a common output node, the high side switch configured for controlling a flow of current therethrough dependent at least in part upon the high side output;*

*a low side switch coupled to the common output node, the low side switch configured for controlling a flow of current therethrough dependent at least in part upon the low side output;*

*an amplifier having a first input, a second input and an output, the second input coupled to a reference signal;*

*a current feedback resistor to provide a signal representative of a load current to the first input of the amplifier;*

*a variable impedance component coupled to the output of the amplifier, the variable impedance component con-*

*figured to vary in impedance dependent at least in part upon the output of the amplifier; and*

*a sample and hold circuit coupled to the converter circuit and the variable impedance component, the sample and hold circuit configured to sample and hold a current sourced through the variable impedance component.*

*24. The power supply of claim 23, wherein the variable impedance component comprises one of a field effect transistor and a bipolar transistor.*

*25. The power supply of claim 23, further comprising an inductor having a first end and a second end, the first end coupled to the common output node, the second end configured for being coupled to a load.*

*26. The power supply of claim 23, wherein the variable impedance component further includes a node that is coupled to the first input of the amplifier.*

*27. A DC/DC converter, comprising:*

*a control circuit, including:*

*a converter circuit having an input, a high side output and a low side output;*

*at least one current sense node that is adapted to receive a current signal;*

*an amplifier having at least one input coupled to the at least one current sense node and having an output;*

*a variable impedance component coupled to the output of the amplifier, the variable impedance component configured to vary in impedance dependent at least in part upon the output of the amplifier; and*

*a sample and hold circuit coupled to the input of the converter circuit, wherein the sample and hold circuit is configured to sample and hold a current sourced through the variable impedance component;*

*a high side switch coupled to a common output node, the high side switch coupled to the high side output of the converter circuit;*

*a low side switch coupled to the common output node, the low side switch coupled to the low side output of the converter circuit; and*

*a current sense resistor coupled to the at least one current sense node and the common output node.*

*28. The DC/DC converter of claim 27, wherein the variable impedance component comprises a transistor with an input coupled to the output of the amplifier.*

*29. The DC/DC converter of claim 27, wherein the amplifier has two inputs, the first input coupled to the current sense node and the second input coupled to a reference.*

*30. The DC/DC converter of claim 27, wherein the variable impedance component comprises a transistor with a first node coupled to the output of the amplifier, a second node coupled to the current sense node and a third node coupled to the sample and hold circuit.*

*31. A control apparatus for a DC/DC converter, comprising:*

*a converter circuit having an input, a high side output adapted to drive a high side switch and a low side output adapted to drive a low side switch;*

*at least one current sense node that is adapted to receive a current signal, wherein the current signal is representative of a load current of the DC/DC converter;*

*an amplifier having a first input coupled to the at least one current sense node, a second input coupled to a reference and having an output;*

*a variable impedance component having a first node coupled to the output of the amplifier, a second node coupled to the at least one current sense node and a third node, the variable impedance component configured to vary in impedance dependent at least in part upon the output of the amplifier; and*

*a sample and hold circuit coupled to the converter circuit and to the third node of the variable impedance component, wherein the sample and hold circuit is configured to sample and hold a current sourced through the variable impedance component.*

*32. A power supply, comprising:*

*a DC to DC pulse width modulator converter circuit having an input, a high side output and a low side output;*

*a high side switch electrically connected intermediate a common output node and a voltage supply, the high side switch configured for controlling a flow of current therethrough dependent at least in part upon the high side output;*

*a low side switch electrically connected to the common output node and to ground through a sense resistor, the low side switch configured for controlling a flow of current therethrough dependent at least in part upon the low side output;*

*an amplifier having a first input, a second input and an output, the second input coupled to a reference;*

*a current feedback resistor coupled intermediate the sense resistor and the first input of the amplifier;*

*a variable impedance component coupled to the output of the amplifier and to the first input of the amplifier, the variable impedance component configured to vary in impedance dependent at least in part upon the output of the amplifier; and*

*a sample and hold circuit coupled intermediate the converter circuit and the variable impedance component, the sample and hold circuit configured to sample and hold a current sourced through the variable impedance component.*

*33. A current sense circuit, comprising:*

*a node adapted to receive a signal representative of a load current;*

*an amplifier responsive to the signal received at the node and having an output;*

*a variable impedance component, responsive to the output of the amplifier, the variable impedance component providing current to the node based on the output of the amplifier; and*

*a sample and hold circuit adapted to sample and hold a signal representative of the current provided to the node through the variable impedance component.*

*34. A control apparatus for a DC/DC converter, comprising:*

*a converter circuit having an input, a high side output adapted to drive a high side switch and a low side output adapted to drive a low side switch;*

*at least one current sense node that is adapted to receive a current signal, wherein the current signal is representative of a load current of the DC/DC converter;*

*an amplifier having a first input coupled to the at least one current sense node, a second input coupled to a reference and having an output;*

*a variable impedance component having a first node coupled to the output of the amplifier, a second node responsive to the current signal at the at least one current sense node and a third node, the variable impedance component configured to vary in impedance*

*dependent at least in part upon the output of the amplifier; and*

*a sample and hold circuit coupled to the converter circuit and to the third node of the variable impedance component, wherein the sample and hold circuit is configured to sample and hold a current sourced through the variable impedance component.*

*35. A control apparatus for a DC/DC converter, comprising:*

*a converter circuit having an input, a high side output adapted to drive a high side circuit and a low side output adapted to drive a low side circuit;*

*at least one current sense node that is adapted to receive a current signal when the low side circuit is in an on condition;*

*an amplifier having at least one input coupled to the at least one current sense node and having an output;*

*a variable impedance component coupled to the output of the amplifier, the variable impedance component configured to vary in impedance dependent at least in part upon the output of the amplifier; and*

*a sample and hold circuit coupled to converter circuit, wherein the sample and hold circuit is configured to sample and hold a current sourced through the variable impedance component; and*

*wherein the converter circuit includes:*

*a circuit that combines the sampled and held current sourced through the variable impedance component, a signal representative of the output voltage and a first reference signal to thereby determine an error signal;*

*a comparator, responsive to the error signal, that is adapted to compare the error signal to a second reference signal to thereby determine a control signal; and*

*an output circuit, responsive to the control signal from the comparator, the output circuit driving the high side and low side outputs based at least in part upon the control signal.*

*36. The control apparatus of claim 35, wherein the variable impedance component comprises a transistor with an input coupled to the output of the amplifier.*

*37. The control apparatus of claim 35, wherein the amplifier has two inputs, the first input coupled to the current sense node and the second input coupled to a reference.*

*38. The control apparatus of claim 35, wherein the variable impedance component comprises a transistor with a first node coupled to the output of the amplifier, a second node coupled to the current sense node and a third node coupled to the sample and hold circuit.*

*39. A power supply, comprising:*

*a converter circuit having an input, a high side output and a low side output;*

*a high side switch coupled to a common output node, the high side switch configured for controlling a flow of current therethrough dependent at least in part upon the high side output;*

*a low side switch coupled to the common output node, the low side switch configured for controlling a flow of current therethrough dependent at least in part upon the low side output;*

*an amplifier having a first input, a second input and an output, the second input coupled to a reference signal;*

*a current feedback resistor to provide a signal representative of a load current to the first input of the amplifier;*

*a variable impedance component coupled to the output of the amplifier, the variable impedance component configured to vary in impedance dependent at least in part upon the output of the amplifier; and*

*a sample and hold circuit coupled to the converter circuit and the variable impedance component, the sample and hold circuit configured to sample and hold a current sourced through the variable impedance component;*

*wherein the converter circuit includes:*

*an error amplifier adapted to issue an error signal dependent at least in part upon a signal representative of the output voltage, the sampled and held current sourced through the variable impedance component and a first reference signal;*

*a comparator, responsive to the error signal from the error amplifier, the comparator adapted to issue a comparator signal, the comparator signal based at least in part upon the error signal and a second reference signal; and*

*an output circuit, responsive to the output signal from the comparator, and adapted to provide a control signal based at least in part upon the comparator signal, where the control signal to drive the low side and high side switches.*

*40. The power supply of claim 39, wherein the variable impedance component comprises one of a field effect transistor and a bipolar transistor.*

*41. The power supply of claim 39, further comprising an inductor having a first end and a second end, the first end coupled to the common output node, the second end configured for being coupled to a load.*

*42. The power supply of claim 39, wherein the variable impedance component further includes a node that is coupled to the first input of the amplifier.*

* * * * *